United States Patent [19]

Stott

[11] 4,397,965

[45] Aug. 9, 1983

[54] EXPANDABLE AND CURABLE POLYESTER RESIN COMPOSITION AND METHOD FOR MAKING SAME

[75] Inventor: Paul E. Stott, Cheshire, Conn.

[73] Assignee: Uniroyal, Inc., New York, N.Y.

[21] Appl. No.: 334,787

[22] Filed: Dec. 28, 1981

[51] Int. Cl.³ .............................................. C08J 9/10
[52] U.S. Cl. .................................... 521/128; 521/138; 521/182
[58] Field of Search .................. 521/182, 138, 128

[56] References Cited

U.S. PATENT DOCUMENTS

| | | | |
|---|---|---|---|
| 3,920,589 | 11/1975 | Jacobs et al. | 521/182 |
| 3,920,590 | 11/1975 | Jacobs et al. | 521/182 |
| 3,920,591 | 11/1975 | Jacobs et al. | 521/182 |
| 4,322,502 | 3/1982 | Stott et al. | 521/99 |
| 4,327,196 | 4/1982 | West et al. | 521/182 |

*Primary Examiner*—Morton Foelak
*Attorney, Agent, or Firm*—Andrew D. Maslow

[57] ABSTRACT

An expandable and curable polyester composition comprising a mixture of a liquid, ethylenically unsaturated polyester resin composition; a peroxide; an organometallic promotor; and a dialkyl or trialkyl hydrazine is disclosed. In addition, a method for forming said expanded and cured polyester resin composition, and the product formed in accordance with said method, an expanded and cured polyester resin composition, is taught.

18 Claims, No Drawings

EXPANDABLE AND CURABLE POLYESTER RESIN COMPOSITION AND METHOD FOR MAKING SAME

BACKGROUND OF THE INVENTION

1. Field of the Invention

The present invention is directed to an expandable and curable polyester composition, the method for making same and the product of said method. More specifically, the present invention is directed to an expandable and curable polyester composition comprising a mixture of a liquid, ethylenically unsaturated polyester resin composition; a peroxide; an organometallic promoter; and a dialky hydrazine or a trialkyl hydrazine, and the method for making same.

2. Description of the Prior Art

There are several references to expandable and curable polyester compositions employed and to methods to prepare said expandable and curable polyester compositions. These methods usually include foaming and crosslinking as separate operations. Either a foam is prepared then crosslinked without destroying it, or the resin is crosslinked while gas is released into it. In either of the approaches the gas may be provided by a variety of means. Other methods use certain chemicals acting as curing and/or foaming agents, but their commercial application has been greatly hindered by extreme stability and/or toxicity problems or lack of practicality.

Certain references of interest disclose the syntheses of foamable and curable polyester compositions. U.S. Pat. No. 3,410,719, issued Nov. 12, 1968 (Roper) teaches the preparation of non-foamed solid acrylic-type coating compositions employing certain alkyl- or arylhydrazines in combination with either a peroxide or an organic salt.

U.S. Pat. No. 3,920,589, issued Nov. 18, 1975, (Jacobs et al.) deals with a method for expanding unsaturated polyester resins using certain sulfonylhydrazides, a peroxide catalyst, a cobalt accelerator and a redox halogen-containing compound. Closely related U.S. Pat. No. 3,920,590, issued Nov. 18, 1975, (Jacobs et al.) deals with the expansion and curing of unsaturated polyesters using 4,4-oxybis(benzenesulfonyl) hydrazide, hydrazine, together with 5 to 30 times the normal level of peroxide and metal organic salt normally used for the cure of such polyester. It is noted that this method does not require the addition of any redox compound. Yet another closely related method, U.S. Pat. No. 3,920,591, also issued on Nov. 18, 1975 (Jacobs et al.), discloses a method for the expansion and cure of unsaturated polyester resins employing a combination of sulfonyl hydrazines, peroxides and amines.

The method of Kamens et al. for making an expandable and curable polyester, published in U.S. Pat. No. 3,993,609, issued Nov. 23, 1976, comprises the use of certain acid sensitive azo compounds such as 2-t-butylazo-2-hydroxybutane, a curing agent, such as a peroxide, and a promotor such as copper naphthenate. It is known that azo compounds are difficult to handle, require refrigeration and provide very short pot lives.

A process for making textured foam thermoplastic sheets for reaction of sulfonyl carboxyl hydrazines or 1,1-dialkyl hydrazines with a peroxide by heating the plastic sheet containing both materials is taught in U.S. Pat. No. 3,574,665 issued to Kwart et al.

Neither the methods of the references above nor any other processes known have proved to be a commercial success because of high cost or impracticality. It is believed that the instant invention is a significant improvement over previous methods and provides industry with a viable and practical method for making foamed and cured polyester products at reduced cost.

Recently an improved expandable and curable polyester composition, useful in providing an improved method for simultaneously foaming and curing a polyester resin has been developed.

This method is set out in pending U.S. patent application, Ser. No. 219,420, filed Dec. 22, 1980. The foamable and curable polyester composition disclosed in this application includes a liquid unsaturated polyester resin, an organic peroxide or hydroperoxide, an organo metallic promoter for the peroxide and a sulfonyl hydrazide blowing agent.

A still earlier copending application, Ser. No. 186,099, filed Sept. 11, 1980 by Stott and Wheeler, and assigned to the same assignee as the present application, discloses a method for making a cured and expanded polyester resin. It is also directed to a curable and crosslinkable composition useful in such a method which includes mixture of a liquid unsaturated polyester resin, a peroxide, a metal salt of an organic acid capable of promoting the compositions of peroxide and a compound selected from the group consisting of monoalkylhydrazine and hydrazone. Again, this composition, useful in the method of forming a foamed polyester resin, represents an advance in the art. However, monoalkylhydrazines or hydrazones require special handling conditions.

In summary, until the disclosures set forth in the latter two applications, there were no chemical compounds or mixtures reported which met all the necessary criteria for good shelf life, good pot life in the resins, compatibility with standard resin processing equipment and the ability to produce uniform essentially crack-free foams from a wide range of general purpose unsaturated polyester resins. With the introduction of the two applications mentioned immediately above, the problems of the prior art were substantially alleviated. However, problems associated with the hydazine component in the expandable and curable polyester composition mixture still exists. These mixtures are either not as stable, or not as efficient as one would wish.

SUMMARY OF THE INVENTION

A new expandable and curable polyester composition has now been found which not only meets the necessary criteria of good shelf life, good pot life in the resins, compatibility with standard resin processing equipment and the ability to produce uniform essentially crack-free foams from a wide range of general purpose unsaturated polyester resins, but moreover, one that employs a blowing agent which has either improved stability or is more efficient than known methods.

In accordance with the instant invention, an expandable and curable polyester composition is disclosed. The composition comprises a mixture of a liquid, ethylenically unsaturated polyester resin; a peroxide; an organo metallic promoter for such peroxide; and a hydrazine having the structural formula $RR^1NHR^2$ wherein R and $R^1$ may be the same or different and are $C_1$–$C_{18}$ alkyl, $C_2$–$C_{18}$ alkenyl, $C_3$–$C_{10}$ cycloalkyl, $C_7$–$C_9$ aralkyl, or R and $R^1$ together are $C_2$–$C_5$ alkylene, $C_4$–$C_5$ alkenylene or $C_3$–$C_4$ oxydialkylene; $R^2$ is hydrogen, $C_1$–$C_{12}$ alkyl, $C_2$–$C_{12}$ alkenyl, $C_5$–$C_6$ cycloalkyl, or $C_7$–$C_9$ aralkyl.

DETAILED DESCRIPTION

The unsaturated polyesters employed in this invention may be described as thermosetting polyesterification or condensation products of a polycarboxylic acid with a polyhydric alcohol, at least one of which if ethylenically unsaturated, usually monoethylenically unsaturated. In practice, these polyesters are frequently used as polyester resins in admixture with copolymerizable ethylenically unsaturated monomers, such as styrene, acrylic or methacrylic esters or nitriles, diallyl phthalate triallyl, cyanurate, etc. (See, for example, U.S. Pat. Nos. 2,255,313, Ellis, Sept. 9, 1941; 2,667,430, Wells, Jan. 26, 1954; 3,267,055 Amidon, Aug. 16, 1966). Frequently, the unsaturated polyester is made from one or more glycols and one or more alpha, beta-ethylenically unsaturated polycarboxylic acids. By way of non-limiting example it may be mentioned that polyester can be prepared from such acids or anhydrides as maleic, fumaric, aconitic, mesaconic, citraconic, ethylmaleic, pyrocinchoninic, veronic or itaconic acid (with or without such acids as adipic, succinic, sebasic, phthalic, linolenic, linoleic, elaeosteric, etc.), with such glycols as ethylene, diethylene, triethylene, polyethylene, 1,3-propylene, 1,2-propylene, dipropylene (1,3 or 1,2), butylene or styrene glycol.

The acid number of polyester resins may range from 0 to 150, preferably greater than 0 up to 75 and most preferably from 7.5 to 40, expressed in milligrams of KOH per gram of polyester resin.

A great number of peroxides are useful for carrying out this invention. Among the peroxides within the comtemplation of this invention are organic peroxides, organic hydroperoxides and hydrogen peroxide. Other non-limiting examples of suitable peroxides within the general class mentioned above are benzoyl peroxide, acetyl peroxide, di-t-butyl peroxide, dicumyl peroxide, methyl ethyl ketone peroxide, di-t-butylperoxy dicarbonate, t-butyl peraceate, t-butyl peroctoate, di-t-butyl diphthalate, t-butyl perbenzoate, 2,5-dimethyl-2,5-bis(benzoylperoxy)hexane, 2,5-dimethyl-2,5-bis(t-butylperoxy)hexane, t-butyl hydroperoxide, cumene hydroperoxide and 2,5-bis(t-butylperoxy)butane.

The promoters or activators employed include a wide range of organo-metallics and particularly metal salts and soaps which have a beneficial effect in activating or promoting the reaction, and which are known and used in the art as accelerators or promoters. Typical activators include all metal soaps and salts and complexes therefrom generated by their reaction in polyester resin systems. Such activators include salts, soaps and complexes of cobaltous, ferrous, vanadous, cadmium, manganous, cuprous, nickelous, stannous, plumbous, zirconium, chromous ions, etc. The anions of such activators may vary and are often selected to impart solubility to the activators in the polyester system. Typical anions are carboxylates such as $C_2$–$C_{28}$ carboxylates, and includes short-chain acids, fatty acids and naphthenates. Such anions include acetate, propionate, butyrate, 2-ethylhexanoate, hexanoate, octoate, laurate, oleate, linoleate, palmitoate, stearate, acetoacetonates and naphthenics. The preferred activators are the cobalt compounds such as cobalt octoate, cobalt acetylacetonate and cobalt naphthenate. The activators may be used alone or in combination with other activators or metal salts.

Blowing agents are employed to expand the resin. The blowing agents within the contemplation of this invention are a class of hydrazines. These hydrazine compounds, employed for carrying out this invention, have the structural formula $RR^1NNHR^2$ wherein R and $R^1$ may be the same or different and are $C_1$–$C_{18}$ alkyl, $C_2$–$C_{18}$ alkenyl, $C_3$–$C_{10}$ cycloalkyl, $C_7$–$C_9$ aralkyl, or R and $R^1$ together are $C_2$–$C_5$ alkylene, $C_4$–$C_5$ alkenylene or $C_3$–$C_4$ oxydialkylene; $R^2$ is hydrogen, $C_1$–$C_{12}$ alkyl, $C_2$–$C_{12}$ alkenyl, $C_5$–$C_6$ cycloalkyl, or $C_7$–$C_9$ aralkyl.

Preferred hydrazines within the general class mentioned above include 1,1-diisopropylhydrazine, 1,1-dimethylhdrazine, 1,1-diethylhydrazine, 1,1-dipropylhydrazine, 1,1-dibutylhydrazine, 1,1-diisobutylhydrazine, 1,1-dipentylhydrazine, 1,1-dihexylhydrazine, 1,1-diheptylhydrazine, 1,1-dioctylhydrazine, 1,1-dinonylhydrazine, 1,1-didecylhydrazine, 1,1-didodecylhydrazine, 1,1-ditetradecylhydrazine, 1,1-dioctodecylhydrazine, 1,1-dicyclopentylhydrazine, 1,1-dicyclolylhydrazine, 1,1-dixylylhydrazine, 1,1-dibenzylhydrazine, N-amino piperidine, N-amino morpholine, N-amino pyrolidine, 1-methyl-1-xylylhydrazine, 1-methyl-1-benzylhydrazine, 1-methyl-1-ethylhydrazine, 1-methyl-1-propylhydrazine, 1-methyl-1-butylhydrazine, 1-methyl-1-decylhydrazine, 1-methyl-1-isopropylhydrazine, 1-methyl-1-isobutylhydrazine, 1-methyl-1-benzylhydrazine, 1-methyl-1-octylhydrazine, 1-methyl-1-dodecylhydrazine, 1-ethyl-1-propylhydrazine, 1-ethyl-1-butylhydrazine, 1-ethyl-1-isopropylhydrazine, 1-ethyl-1-benzylhydrazine, 1-ethyl-1-xylylhydrazine, 1-benzyl-1-propylhydrazine, 1-benzyl-1-butylhydrazine, 1-benzyl-1-hexylhydrazine, 1-benzyl-1-isobutylhydrazine, 1-benzyl-1-octylhydrazine, 1-benzyl-1-decylhydrazine, 1,1,2-trimethylhydrazine, 1,1,2-triethylhydrazine, 1,1,2-tripropylhydrazine, 1,1,2-triisopropylhydrazine, 1,1-dimethyl-2-ethylhydrazine, 1,1-dimethyl-2-propylhydrazine, 1,1-dimethyl-2-butylhydrazine and 1,1-dimethyl-2-isobutylhydrazine.

This list, which is not exhaustive, emphasizes the special suitability of hydrazines, within the general class given by the formula above, wherein $R^2$ is hydrogen. Within the class wherein $R^2$ is hydrogen many hydrazines are characterized by R and $R^1$ being the same or different and being $C_1$–$C_4$ alkyl, cyclohexyl, benzyl or where R and $R^1$ together are $C_4$–$C_5$ alkylene or $C_4$ oxydialkylene. Obviously, other hydrazines outside these preferred classes of hydrazines are within the contemplation of this invention. Indeed, several of the specific hydrazines listed above are outside the preferred classes.

The addition of a suitable surfactant to the reaction mixture is not essential but may be helpful in establishing a more stable foam and a finer, more uniform cell structure. Anionic, cationic or non-ionic surfactants may be employed to aid in nucleation and bubble stabilization. Such surfactants include nonyl phenyl poly(ethylene glycol) ether, nonyl phenoxy poly(ethyleneoxy)ethanol, di-tridecyl sodium sulfosuccinate, stearyl dimethylbenzyl ammonium chloride and sodium salt of alkyl aryl polyether sulfonate. Also useful are silicone type surfactants. Care should be taken that the overall acid number remains positve. Of the surfactants that can be used, non-ionic surfactants are especially preferred.

In order to carry out this invention several approaches may be taken. Ordinarily, the promoter and hydrazine blowing agents are first thoroughly mixed with the polyester resin and then the peroxide is added while agitating. Alternatively, one portion of the resin may be blended with the hydrazine and the promoter while to a second resin portion the peroxide is added; then both resin portions are combined. Such mixtures may be poured into molds, cast or sprayed, although for spray applications all ingredients may be fed simultaneously to a mixing head immediately prior to spraying. Care should be taken not to pre-combine peroxide with hydrazine or the promoter. The inclusion of air (oxygen) in the reaction mixture due to too vigorous agitation in the presence of air may inhibit curing or foaming and should therefore be avoided. Thorough blending may be achieved in a closed system or under an inert gas (e.g., nitrogen) blanket.

The liquid unsaturated polyester resins also typically include inert fillers. Among the fillers employed in this application are hollow glass or plastic microsphere beads, wood flour, silica, diatamaceious earth, ground glass, calcium carbonate, alumina trihydrate, clay and the like.

The components of the expandable and curable polyester composition of this invention include a mixture which comprises 100 grams of the unsaturated polyester resin or vinylester resin. The hydrazine compound is present in the mixture in a concentration of between about 0.32 to about 70 millimoles per 100 grams of resin. It is noted that the hydrazine is expressed in mole concentration in that the hydrazines within the contemplation of this invention have significantly different molecular weights. The promoter, the metal constituent, added as an organic compound, is present in a concentration in the range of between about 0.001 to 0.32 parts by weight per 100 grams of resin (pph). The fourth constituent, the peroxide, is present in a concentration in the range of 0.5 to 5.0 parts by weight per 100 grams of resin (pph). More preferably, the concentration of the critical ingredients is 100 grams of the polyester or vinylester resin; 1 to 50 millimoles of the hydrazine compound, 0.003 to 0.16 parts by weight of the metal, added as an organic compound, and 1.0 to 4.0 parts by weight of the peroxide. Most preferably, the concentration of the components include 100 grams of the unsaturated polyester or vinylester resin, 3.2 to 15 millimoles of the hydrazine compound, 0.005 to 0.08 parts by weight of the metal, added as an organic compound, and 1.0 to 4.0 parts by weight of peroxide.

In a preferred embodiment the unsaturated polyester resin is a 60:40 blend of propylene glycol maleate phthalate to styrene when the unsaturated resin is a polyester resin. when a vinylester resin is employed, a preferred resin is a 60:40 blend of methacrylate terminated epoxy in styrene. A preferred hydrazine blowing agent is any 1,1-dialkylhydrazine. A preferred metal promoter, as an organic compound, is either cobalt or a combination of cobalt and copper. Preferably, the organic compound employed is cobalt octoate or cobalt naththenate. Among the preferred peroxides are 30% active hydrogen peroxide, 50% methyl ethyl ketone peroxide or a blend of the two above recited peroxides.

As stated above, additional ingredients may be included in the expandable and curable polyester composition of this invention. A filler, selected from among those described hereinbefore, may be present. When a filler is employed up to 150 parts by weight of the filler may be added to the mixture which comprises the expandable and curable polyester composition. The particular filler employed is not critical and may be any of those recited above.

The following examples are given to illustrate the invention. However, the scope of the invention should not be limited by the specific examples given below.

EXAMPLE 1

An oligomer resin was formed consisting essentially of the reaction product of 1 mole of phthalic acid, 1 mole of maleic anhydride and 2 moles of propylene glycol diluted with styrene in the ratio of 60 parts by weight oligomer of the above polyester to 40 parts by weight of styrene. To 222 parts of this resin was added 2 parts of a surfactant, DC 193 Silicone (trademark) surfactant, a silicone glycol copolymer.

Six such master batches were prepared. In the first master batch, 0.056 parts per 100 of cobalt naphthenate (8% Co) promoter was added to 25 grams of the master batch resin in an 118 ml paper cup. To this was added 0.25 gram or 1.0 parts per hundred (pph) of 1,1-dimethylhydrazine. The constituents were then thoroughly mixed. To this mixture was added 0.5 gram or 2 parts per hundred (pph) of 50% methyl ethyl ketone (MEK) peroxide. The mixture was vigorously stirred with a glass rod for 15 seconds or until gelation occurred, whichever was shorter.

The density of the resultant reaction was measured by the water displacement method. To determine density by this method a cup containing the foamed and cured polyester resin is filled to the top with water. The volume of the polyester resin is thus measured as the difference between the volume of the cup and the volume of the water, which is poured from the cup into a graduated cylinder.

The weight of the polyester resin is determined by weighing the cup which includes the resin and subtracting the previously weighed empty cup. Using these calculations the density was found to be 0.65 g/cm$^3$.

The gel time, in seconds, was measured by the snap back method. In the snap back method a small glass rod is immersed into the polyester resin. Actually, the rod is only immersed just beneath the surface of the resin, i.e., about 5 millimeters. The rod is quickly removed. When the resin snaps back rather than flows from the rod, the gel point has been reached. That time, measured from the time of introduction of the peroxide into the reaction mass is measured as the gel time. In this case, the gel time was 30 seconds.

The percent density reduction was 41%. Percent density reduction, a measurement of the degree of expansion, is calculated as the decrease in density resulting from the effect of the blowing agent.

It is noted that the basis upon which the density of these expanded and cured resin compositions are compared is the density of a cured, but not expanded, resin composition which does not include a blowing agent, which in the present invention is a hydrazine, as defined above. A single representative unblown sample was formulated in accordance with the procedure enumerated in this example except, of course, absent the blowing agent, in this example, 1,1-dimethyl hydrazine. The density of the cured, unexpanded resin composition was 1.10 grams per cubic centimeter. The exact formulation, that is, the amount of promoter and peroxide, that was used to form the unblown polyester resin composition, and to thus determine the density reduction is set forth in Table IV, Run 18. It is emphasized that the effect of the concentration of the promoter and the peroxide, upon density is negligible. Thus, this single sample provides a valid comparison run to all the runs in the six examples included herein.

The above Run 1 was repeated using the same master batch but varying the concentration of cobalt naphthenate (8% Co) added to the master batch. The amounts of 1,1-dimethylhydrazine and 50% MEK peroxide, as well as the procedure recited in Run 1, were the same. The five additional runs are denoted Runs 2–6. The results, reported as gel time in seconds, density in grams per cubic centimeter (g/cm$^3$) and density reduction in percent, are tabulated for the six runs in Table I below.

TABLE I

| Run # | Metal Concentration parts per hundred (pph) | Gel Time, Secs. | Density, g/cm$^3$ | % Reduction |
|---|---|---|---|---|
| 1 | 0.0045 | 30 | 0.65 | 41 |
| 2 | 0.009 | 30 | 0.54 | 50 |
| 3 | 0.018 | 20 | 0.42 | 62 |
| 4 | 0.036 | 15 | 0.39 | 65 |
| 5 | 0.072 | 20 | 0.43 | 61 |
| 6 | 0.144 | 15 | 0.42 | 62 |

This example clearly indicates that polyester resins may simultaneously be expanded and cured by employing the hydrazine blowing agents at various levels of promoter, that is, at from smaller to large metal concentration. It is noted that increasing promoter concentration beyond 0.45 part per hundred at these conditions does not lead to greater expansion, measured as reduced density, but does provide accelerate curing, measured in gel time.

EXAMPLE 2

Example 1 was repeated except that the concentration of the promoter, cobalt naphthenate (8% Co), was kept constant at 0.45 pph. The peroxide concentration, the concentration of 50% MEK peroxide, however, was varied in four runs from 1.0 to 4.0 pph in intervals of 1 pph. Table II tabulates gel time, density and density reduction, physical properties of the expanded and cured polyester formed in accordance with this example.

TABLE II

| Run # | Peroxide, (pph) | Gel Time, Sec. | Density, g/cm$^3$ | Dens. Red. % Red. |
|---|---|---|---|---|
| 7 | 1.0 | 23 | 0.57 | 48 |
| 8 | 2.0 | 15 | 0.39 | 65 |
| 9 | 3.0 | 15 | 0.37 | 65 |
| 10 | 4.0 | 15 | 0.31 | 72 |

This example establishes the range of peroxide concentration within the contemplation of this invention. Polyester resin is successfully expanded and cured using a hydrazine blowing agent, within the contemplation of this invention, at various peroxide concentrations. It is noted that the data suggests, within the range tested, that expansion is increased with increasing peroxide levels, all other parameters remaining the same.

EXAMPLE 3

Example 1 was repeated except that instead of varying the promoter metal concentration, that is the amount of cobalt naphthenate, that concentration was maintained constant at either 0.9 phr or 0.45 pph. Rather, the concentration of the hydrazine blowing agent, 1,1-dimethylhydrazine, was varied, in seven runs from 0.2 to 4.0 pph. The results of these runs are summarized in Table III below.

TABLE III

| Run # | Metal Conc., pph Co | Peroxide (pph) | Blowing Agent, (pph) | Gel Time, Sec. | Density g/cm$^3$ | Dens. Red. % Red. |
|---|---|---|---|---|---|---|
| 11 | 0.072 | 3.0 | 0.2 | 45 | 0.81 | 27 |
| 12 | 0.072 | " | 0.4 | 40 | 0.81 | 27 |
| 13 | 0.072 | " | 1.0 | 30 | 0.57 | 48 |
| 14 | 0.072 | " | 2.0 | 30 | 0.36 | 68 |
| 15 | 0.072 | " | 4.0 | 30 | 0.28 | 75 |
| 16 | 0.036 | " | 0.2 | 30 | 0.54 | 50 |
| 17 | 0.036 | " | 0.4 | 25 | 0.54 | 50 |

Note:
Runs 14 and 15 required post curing in an oven.

This example demonstrates the effectiveness of the hydrazine blowing agent, within the scope of the instant invention, over a wide range of concentration. It is emphasized that the concentration of hydrazine is shown to be directly proportional to the expansion of the polyester resin composition. It is further noted that at lower hydrazine concentrations the reduction of promoter concentration seems to significantly increase the expansion of the resin composition.

EXAMPLE 4

The Procedure of Example 1 was repeated employing 12.5 grams of the master batch resin prepared therein and combined with 0.125 gram of cobalt naphthenate (8% Co), 0.05 grams of 1,1-dimethylhydrazine and 0.75 grams of 50% MEK peroxide. The constituents mentioned above were combined in accordance with the procedure enumerated in Example 1. However, in addition, 12.5 grams of alumina trihydrate, a filler, was added to the resin to produce a filled resin. The resultant composition had a gel time of 60 seconds, a density of 0.62 g/cm$^3$ and a density reduction of 60%.

EXAMPLE 5

An expandable and curable vinylester resin composition was prepared by starting with an oligomer of 1 mole Bisphenol A reacted with 1 mole epichlorohydrin and the ends terminated with a methacrylate. This oligomer was diluted with styrene in the ratio of 60 parts of oligomer to 40 parts styrene. To 27 g of this resin was added 0.018 grams of cobalt naphthenate (8% Co), 0.005 grams copper naphthenate (8% Cu), 0.05 grams 1,1-dimethylhydrazine and 0.75 gram of 50% MEK peroxide. The constituents were mixed in accordance with the procedure set forth in Example 1.

The composition was tested in accordance with the physical property test discussed in Example 1. The physical properties of the composition were as follows: 5 minutes gel time; 0.63 g/cm$^3$ density; and 42% reduction in density compared to the solid polyester resin.

EXAMPLE 6

Seventeen resin compositions were prepared in which each run started with 25 grams of the polyester master batch having the constituency of the polyester master batch of Example 1. To this was added various hydrazines blowing agents within the contemplation of this invention. The concentration of the hydrazine employed is expressed as millimoles per 100 grams of master batch. In addition the concentration of cobalt (naphthenate (8% Co)) in parts per 100 grams of polyester master batch is recited. The final constituent, the peroxide, which in these examples was either 50% MEK peroxide, 30% hydrogen peroxide or a blend of 50% MEK peroxide and 30% hydrogen peroxide, at the concentration indicated, in parts per 100 grams of master batch, are all set out in Table IV below. Table IV also tabulates the physical properties of the composition produced by the combination of constituents tabulated therein. Thus, gel time, density in g/cm$^3$ and the density reduction in percent for each run is tabulated in Table IV.

TABLE IV

| Run # | Blowing Type Type* | Mmoles** | Metal Conc., pph Co | Peroxide | pph | Gel Time | Density g/cm$^3$ | Density Red % |
|---|---|---|---|---|---|---|---|---|
| 18 | None | — | 0.072 | MEKP | 4.0 | 8 min. | 1.10 | — |
| 19 | UDMH | 3.2 | 0.072 | " | 3.0 | 35 sec. | 0.54 | 50 |
| 20 | IBMH | 14.0 | 0.072 | " | 2.0 | 15 sec. | 0.42 | 62 |
| 21 | DDMH | 14.0 | 0.072 | " | 3.0 | 15 sec. | 0.42 | 62 |
| 22 | UDBH | 14.0 | 0.072 | MEKP | 2.0 | 8 sec. | 0.48 | 55 |
| 23 | UDBH | 14.0 | 0.072 | MEKP/H$_2$O$_2$ | 1.0/1.0 | 8 sec. | 0.45 | 65 |
| 24 | BIPH | 14.0 | 0.072 | MEKP | 2.0 | 8 sec. | 0.64 | 42 |
| 25 | DIBH | 14.0 | 0.072 | MEKP | 2.0 | 10 sec. | 0.67 | 40 |
| 26 | DCHH | 14.0 | 0.072 | MEKP | 2.0 | 20 sec. | 0.65 | 40 |
| 27 | UDDH | 14.0 | 0.072 | MEKP | 2.0 | 8 sec. | 0.65 | 40 |
| 28 | DBH | 14.0 | 0.072 | MEKP | 2.0 | 12 sec. | 0.57 | 48 |
| 29 | XMH | 3.2 | 0.036 | MEKP | 3.0 | 20 sec. | 0.68 | 37 |
| 30 | TIPH | 7.0 | 0.144 | MEKP | 2.0 | 25 sec. | 0.77 | 30 |
| 31 | NAM | 3.2 | 0.036 | MEKP | 3.0 | 45 sec. | 0.64 | 42 |
| 32 | NAP | 3.2 | 0.036 | MEKP | 3.0 | 40 sec. | 0.62 | 40 |
| 33 | NAP | 3.2 | 0.036 | H$_2$O$_2$ | 2.0 | 50 sec. | 0.54 | 50 |
| 34 | NAP | 3.2 | 0.036 | MEKP/H$_2$O$_2$ | 2.0/1.0 | 25 sec. | 0.50 | 55 |

*UDMH = 1,1-Dimethylhydrazine
IDMH = 1-Isobutyl-1-methylhydrazine
DDMH = 1-Dodecyl-1-methylhydrazine
UDBH = 1,1-Dibutylhydrazine
BIPH = 1-Isopropyl-1-butylhydrazine
DIBH = 1,1-Diisobutylhydrazine
DCHH = 1,1-Dicyclohexylhydrazine
UDDH = 1,1-Didecylhydrazine
DBH = 1,1-Dibenzylhydrazine
XMH = 1-o-xylyl-1-methylhydrazine
TIPH = 1,1,2-Triisopropylhydrazine
NAM = N—Aminomorpholine
NAP = N—Aminopiperidine
**Per 100 gram of Polyester Resin This example establishes the usefulness of a wide range of hydrazines, within the contemplation of this invention, as blowing agents for the composition and method of this invention. The data indicates the usefulness of the hydrazine blowing agents, also, as a cure enhancer. This is proven by comparing the gel time for Run 18, which did not include any blowing agent, with the remaining runs, runs 19–34, wherein the gel time is dramatically decreased.

The above preferred embodiments and examples are given by way of illustration and should therefore not be construed as limiting the invention to the embodiments and examples given. Those skilled in the art will infer other embodiments and examples, from the embodiments and examples included herein, which are within the scope and spirt of this invention. Therefore, the invention should only be limited by the scope of the appended claims.

What is claimed is:

1. An expandable and curable polyester composition comprising a mixture of
   a liquid, ethylenically unsaturated polyester resin;
   a peroxide;
   an organo metallic promoter; and
   a hydrazine having the structural formula RR$^1$NNHR$^2$
wherein R and R$^1$ may be the same or different and are $C_1$–$C_{18}$ alkyl, $C_2$–$C_{18}$ alkenyl, $C_3$–$C_{10}$ cycloalkyl, $C_7$–$C_9$ aralkyl, or R and R$^1$ together are $C_2$–$C_5$ alkylene, $C_4$–$C_5$ alkenylene or $C_3$–$C_4$ oxydialkylene; R$^2$ is hydrogen, $C_1$–$C_{12}$ alkyl, $C_2$–$C_{12}$ alkenyl, $C_5$–$C_6$ cycloalkyl, or $C_7$–$C_9$ aralkyl.

2. A composition in accordance with claim 1 wherein R$^2$ in said structural formula for hydrazine is hydrogen and said structural formula for said hydrazine is RR$^1$NNH$_2$.

3. A composition in accordance with claim 2 wherein R and R$^1$ are the same or different and are $C_1$–$C_4$ alkyl, cyclohexyl, benzyl or R and R$^1$ together are $C_4$–$C_5$ alkylene or $C_4$ oxydialkylene.

4. A composition in accordance with claim 1 wherein R and R$^1$ are the same or different and are $C_1$–$C_{12}$ alkyl, cyclohexyl, benzyl, xylyl or R and R$^1$ together are methylene or oxydiethylene; R$^2$ is hydrogen or $C_1$–$C_2$ alkyl.

5. A composition in accordance with claim 1, wherein said composition includes a surfactant.

6. A composition in accordance with claim 1, wherein said mixture includes an inert filler.

7. A composition in accordance with claim 1, wherein said hydrazine is present at a concentration of 0.32 to 70 millimoles per 100 grams of said unsaturated polyester resin.

8. A composition in accordance with claim 7 wherein said hydrazine compound is present at a concentration of 1 to 50 millimoles per hundred grams of said unsaturated polyester resin.

9. A composition in accordance with claim 8 wherein said hydrazine compound is present at a concentration of 3.2 to 15 millimoles per hundred grams of said unsaturated polyester resin.

10. A method for making an expanded and cured polyester resin composition by preparing a mixture comprising:
   a liquid, ethylenically unsaturated polyester resin;
   a peroxide;
   an organo metallic promoter; and a hydrazine having the structural formula RR$^1$NNHR$^2$
wherein R and R$^1$ may be the same or different and are C$_1$–C$_{18}$ alkyl, C$_2$–C$_{18}$ alkenyl, C$_3$–C$_{10}$ cycloalkyl, C$_7$–C$_9$ aralkyl, or R and R$^1$ together are C$_2$–C$_5$ alkylene, C$_4$–C$_5$ are alkenylene or C$_3$–C$_4$ thiodialkylene; R$^2$ is hydrogen, C$_1$–C$_{12}$ alkyl, C$_2$–C$_{12}$ alkenyl, C$_5$–C$_6$ cycloalkyl, or C$_7$–C$_9$ aralkyl.

11. A method in accordance with claim 10 wherein R$^2$ in said hydrazine structural formula is hydrogen and said hydrazine structural formula is RR$^1$NNH$_2$.

12. A method in accordance with claim 11 wherein R and R$^1$ are the same or different and are C$_1$–C$_4$ alkyl, cyclohexyl, benzyl or R and R$^1$ together are C$_4$–C$_5$ alkylene or C$_4$ oxydialkylene.

13. A method in accordance with claim 10 wherein R and R$^1$ are the same or different and are C$_1$–C$_{12}$ alkyl, cyclohexyl, benzyl, xylyl or R and R$^1$ together are methylene or oxydiethylene, R$^2$ is hydrogen or C$_1$–C$_3$ alkyl.

14. A method in accordance with claim 10 wherein a surfactant is added to said mixture.

15. A method in accordance with claim 10 wherein said mixture includes an inert filler.

16. A method in accordance with claim 10 wherein said hydrazine is present at a concentration of 0.32 to 70 millimoles per 100 grams of unsaturated polyester resin.

17. A method in accordance with claim 16 wherein said hydrazine is present at a concentration of 1 to 50 millimoles per 100 grams of said unsaturated polyester resin.

18. A method in accordance with claim 16 wherein said hydrazine compound is present at a concentration of 3.2 to 15 millimoles per 100 grams of said unsaturated polyester resin.

* * * * *

UNITED STATES PATENT AND TRADEMARK OFFICE
CERTIFICATE OF CORRECTION

PATENT NO. : 4397965
DATED : August 9, 1983
INVENTOR(S) : PAUL E. STOTT

It is certified that error appears in the above-identified patent and that said Letters Patent are hereby corrected as shown below:

In claim 4, line 4, delete "methylene" and insert therefor --pentamethylene--;

Line 4, delete "$C_1-C_2$" and insert therefor --$C_1-C_3$--.

Claim 13, line 4, delete "methylene" and insert therefor --pentamethylene--.

Signed and Sealed this

Fourteenth Day of February 1984

[SEAL]

Attest:

GERALD J. MOSSINGHOFF

Attesting Officer

Commissioner of Patents and Trademarks